US008234861B2

(12) United States Patent
Frye

(10) Patent No.: US 8,234,861 B2
(45) Date of Patent: Aug. 7, 2012

(54) FREE FLOW HYDRO-POWERED HYDRAULIC RAM

(76) Inventor: Clarence Edward Frye, Blountville, TN (US)

( * ) Notice: Subject to any disclaimer, the term of this patent is extended or adjusted under 35 U.S.C. 154(b) by 0 days.

(21) Appl. No.: 12/807,672

(22) Filed: Sep. 10, 2010

(65) Prior Publication Data
US 2011/0042956 A1 Feb. 24, 2011

(51) Int. Cl.
F03B 13/00 (2006.01)
(52) U.S. Cl. ............................................. 60/398; 290/43
(58) Field of Classification Search ................ 60/398; 290/43, 52, 53, 54
See application file for complete search history.

(56) References Cited

U.S. PATENT DOCUMENTS

| 873,435 | A | | 12/1907 | Herschel | |
|---|---|---|---|---|---|
| 984,266 | A | | 2/1911 | Doney | |
| 3,922,012 | A | | 11/1975 | Herz | |
| 3,978,345 | A | | 8/1976 | Bailey | |
| 3,980,894 | A | | 9/1976 | Vary | |
| 4,053,253 | A | | 10/1977 | Coffer | |
| 4,053,787 | A | | 10/1977 | Diggs | |
| 4,170,738 | A | | 10/1979 | Smith | |
| 4,184,805 | A | | 1/1980 | Arnold | |
| 4,347,036 | A | | 8/1982 | Arnold | |
| 4,465,941 | A | | 8/1984 | Wilson | |
| 5,842,838 | A | * | 12/1998 | Berg | ............................ 290/53 |
| 6,546,723 | B1 | * | 4/2003 | Watten et al. | .................... 60/398 |
| 6,647,717 | B2 | * | 11/2003 | Zaslavsky et al. | .............. 60/398 |
| 6,729,857 | B2 | | 5/2004 | Zabtcioglu | |
| 6,766,754 | B1 | | 7/2004 | Scott | |
| 7,132,758 | B2 | * | 11/2006 | Rochester et al. | .............. 60/398 |
| 7,240,631 | B1 | | 7/2007 | Al-Babtain | |
| 7,521,816 | B2 | | 4/2009 | Helrich | |
| 2009/0320459 | A1 | | 12/2009 | Frye | |
| 2010/0193447 | A1 | * | 8/2010 | Marcum | ......................... 290/53 |
| 2011/0109089 | A1 | | 5/2011 | Frye | |

OTHER PUBLICATIONS

Handbook of Natural Philosophy: Hydrostatics, Pneumatics, and Heat, by Dionysius Lardner, London Press (1855).
A Device to increase the Effective Head of a Water Power Plant by Utilizing Waste Water, Engineering News, Jun. 11, 1908. Description of Clemmons Herschel Fall Increaser.
The Fall Increaser: Being an Account of Experiments on Negative Pressure; made at Public Testing Flume of the Holyoke Water Power Company, at Holyoke, Mass.; with an apparatus designed to increase the fall acting on Hydraulic turbines in cases of a low fall, when caused by back-water; or, when existing naturally, with a plentiful supply of water, for the purpose of increasing the speed of revolution of the turbines. By Clemmons Herschel The Harvard Engineering Journal, vol. VII, Jun. 1908, p. 65.

(Continued)

Primary Examiner — Thomas E Lazo

(57) ABSTRACT

The water powered hydraulic ram, when housed in a supporting water-tight structure deep within a moving body of water, functions essentially as a four cycle engine with water as it prime mover. It is a linear motor, just as if it were powered by ordinary fossil-based fuels. It harnesses the force of moving water and the pressure of water at a depth and becomes a prime mover whose output is hydro-power. The component parts of this linear motor are a hydraulic ram cylinder, sliding ram pistons, a venturi/eductor jet pump, electronic piston positioning sensors, solenoid controlled valves and process program software. It is positioned to face an oncoming, irresistible downstream water force. It may be either singular or in plurality as an array. The ideal application is for a reverse osmosis membrane to remove the salt from seawater providing unlimited quantities of potable, fresh drinking water.

11 Claims, 12 Drawing Sheets

OTHER PUBLICATIONS

Handbook of Natural Philosophy: Hydrostatics, Pneumatics and Heat by Dionysious Lardner, London Press (1885).

A Device to Increase the Effective Head of a Water Power Plant by Utilizing Waste Water, Engineering News, Jun. 11, 1908 which contains a description of Fall Increaser.

The Fall Increaser: Being an Account of Experiments on Negative Pressure, made at a Public Testing Flume of of the Holyoke Water Company, at Holyoke Mass., with an Apparatus designed to increase the fall acting on Hydraulic Turbines in cases of a low fall, when caused by back water; or , when existing naturally, with a plentiful supply of water for the purpose of increasing the speed of revolution of the turbines. By Clemmons Herschel. The Harvard Engineering Journal, vol. VII, Jun. 1908, p. 65.

* cited by examiner

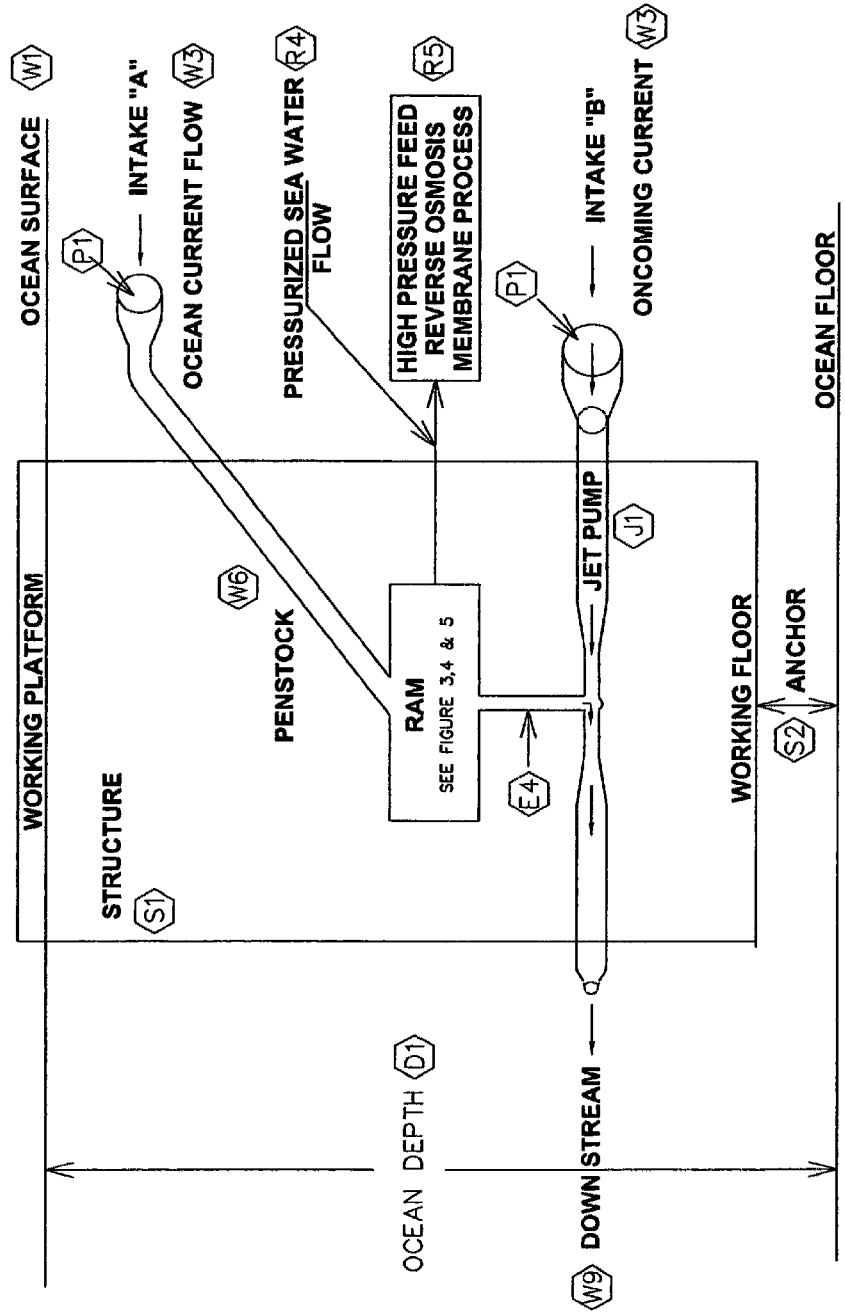

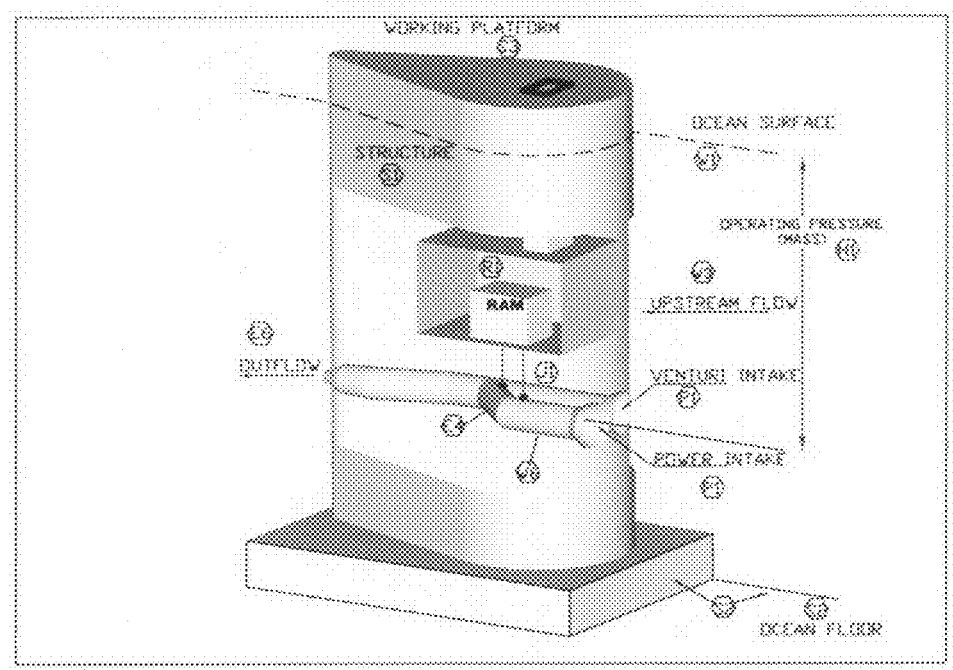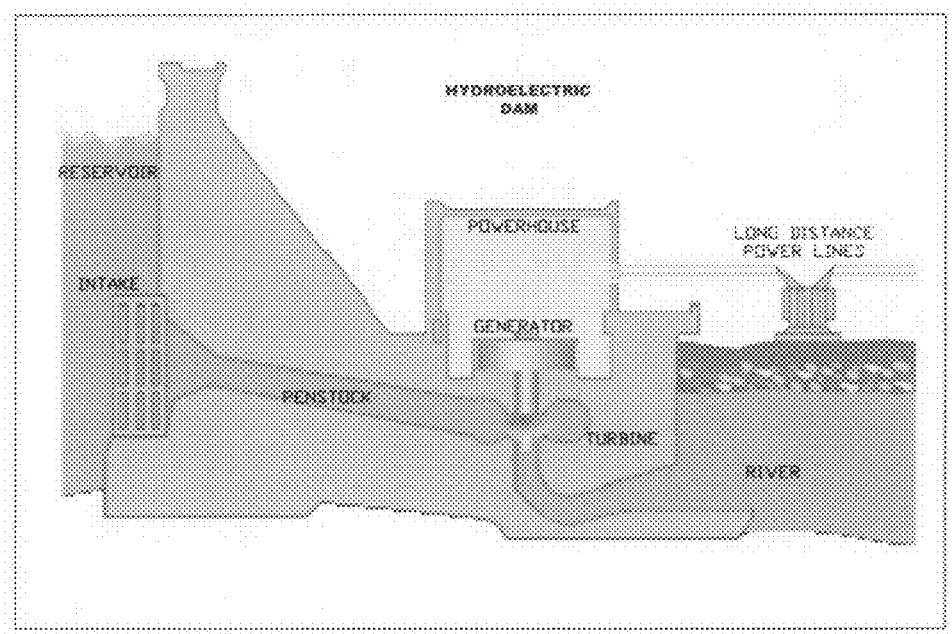

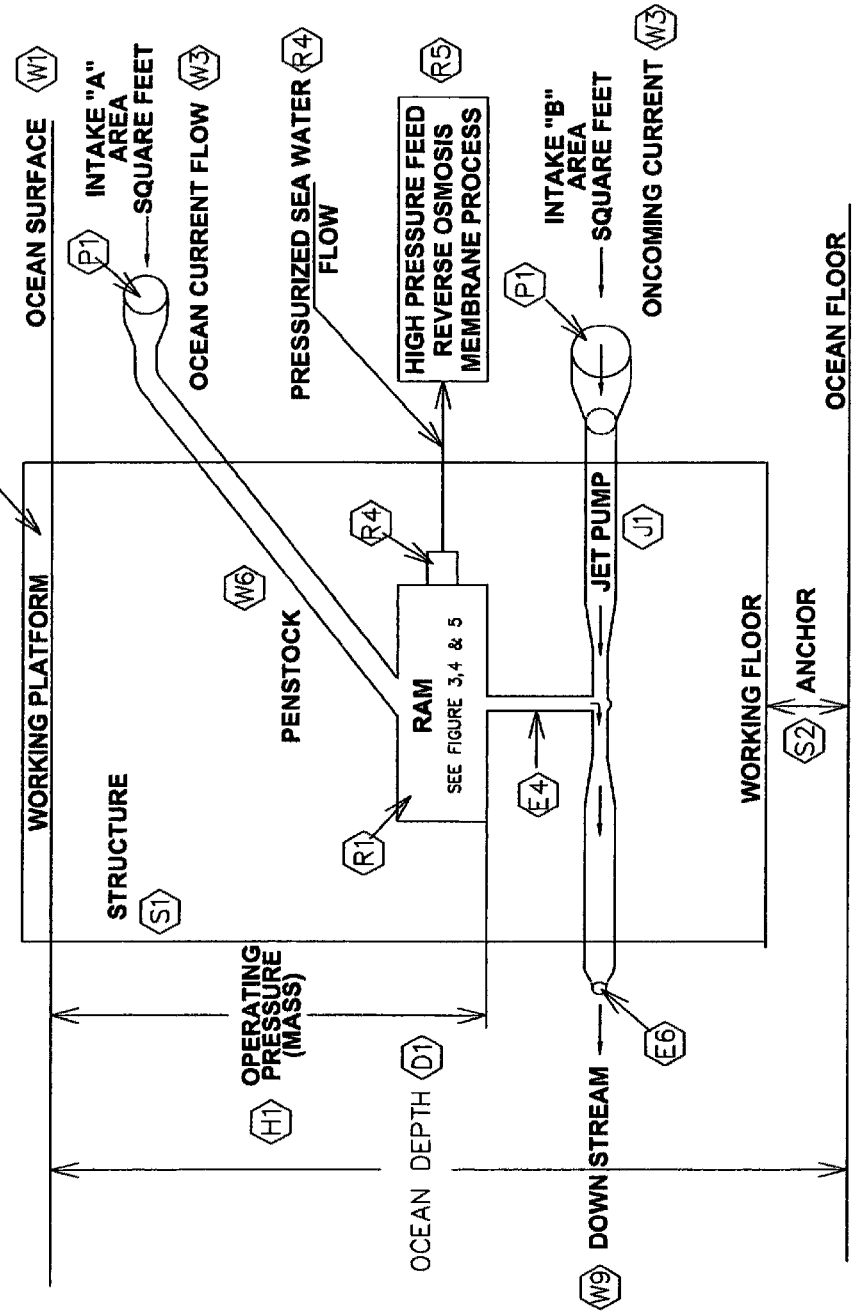

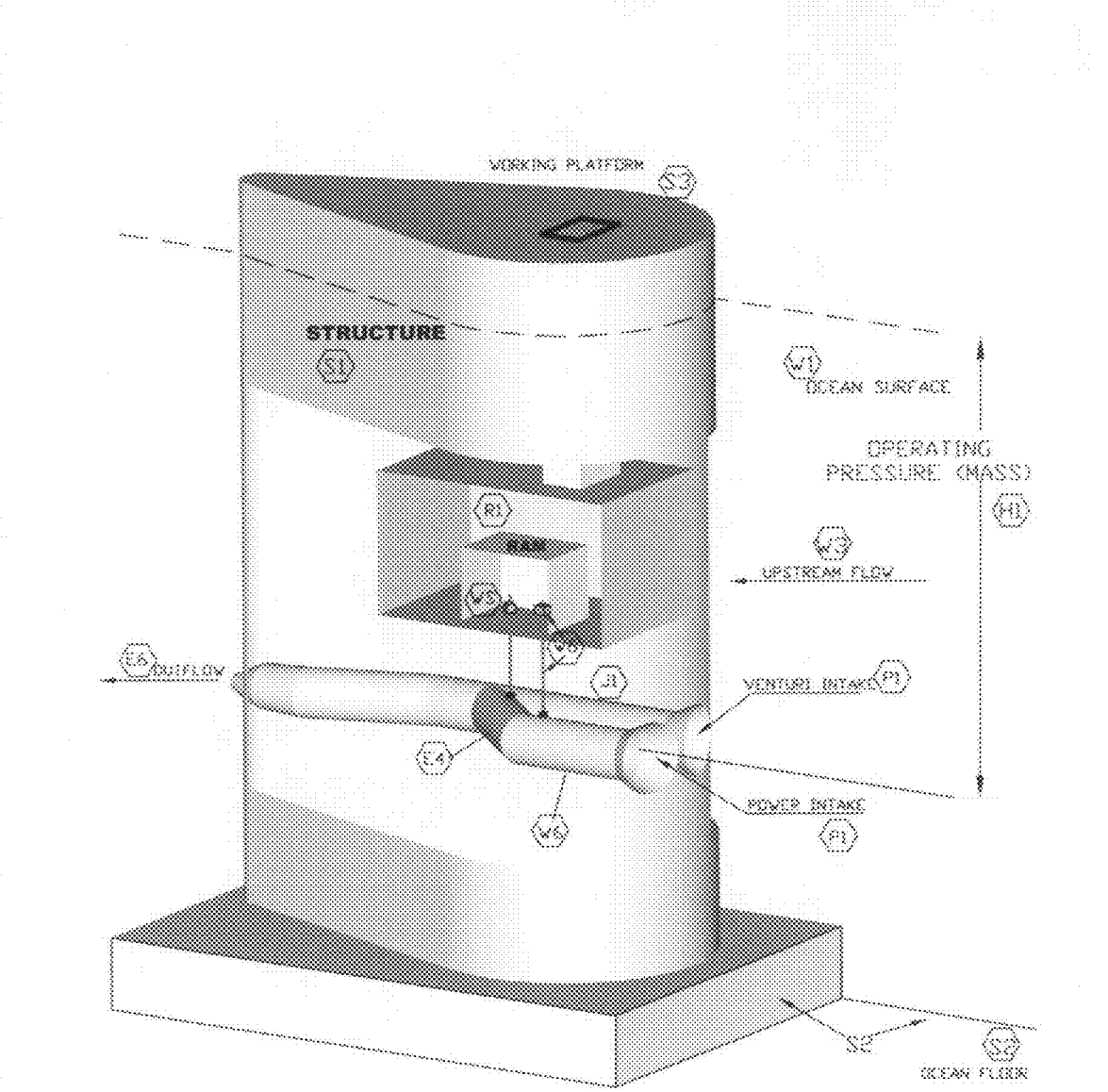

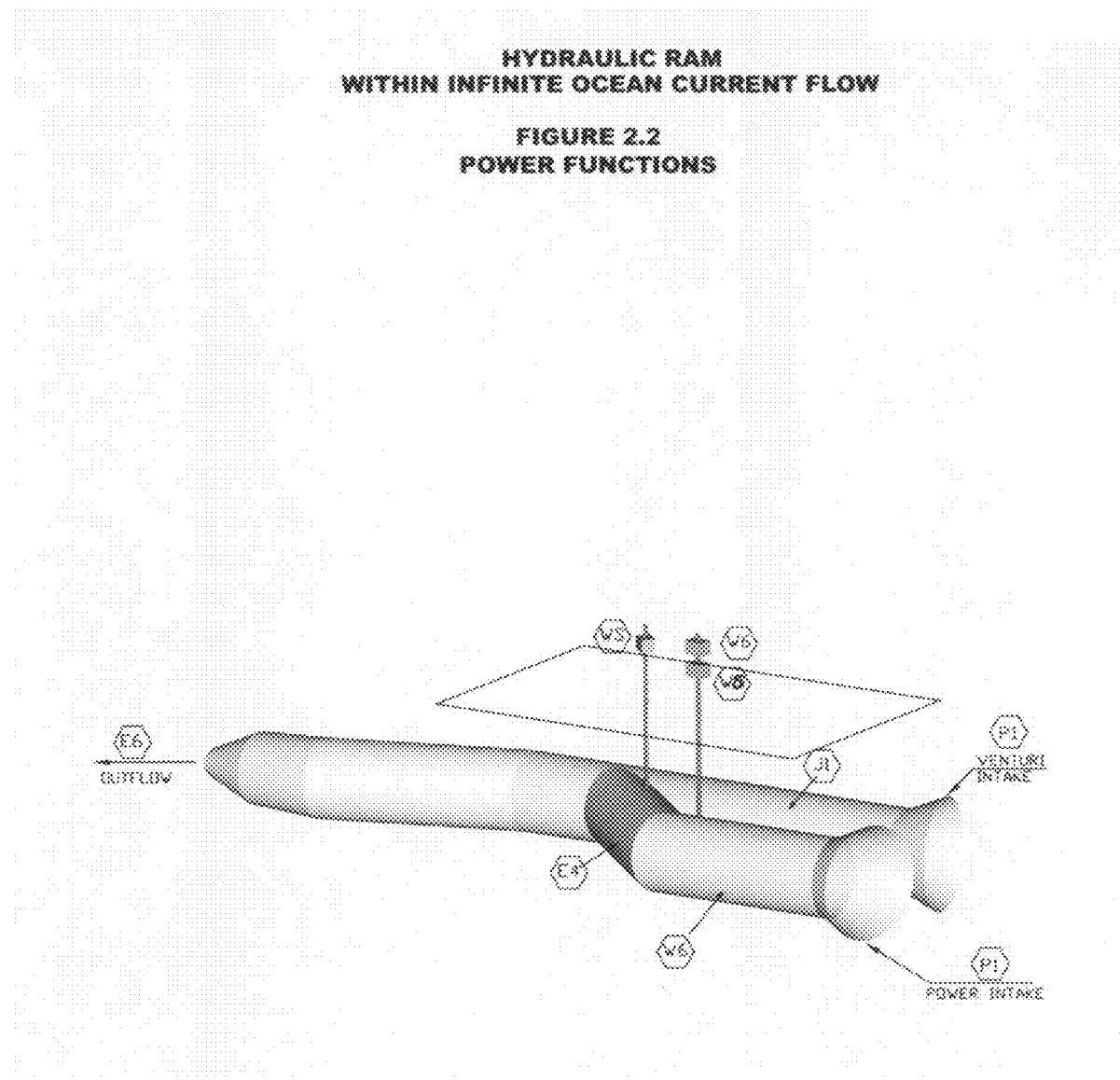

**HYDRAULIC RAM
WITHIN INFINITE OCEAN CURRENT FLOW
FIGURE 2.3
POWER FUNCTIONS**
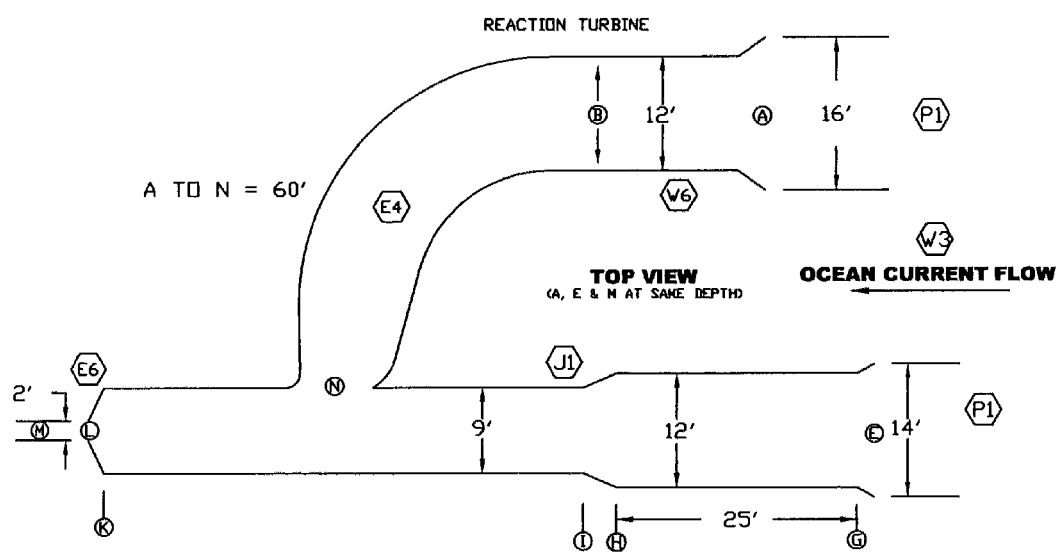

HYDRAULIC RAM
WITHIN INFINITE OCEAN CURRENT FLOW
FIGURE 2.4
POWER FUNCTIONS

DESCRIPTION: FLOW THROUGH TURBINE AND VENTURI WITH ONE CONE LEADING TO TURBINE AND ONE CONE LEADING TO VENTURI. BOTH CONES ARE AT SAME DEPTH THEY DON'T APPEAR TO BE AT SAME DEPTH IN DIAGRAM. VENTURI OUTLET AT SAME DEPTH AS CONES. USED TO EVALUATE HYDRO-POWER DYNAMICS FOR ARRANGEMENT IN FIGURE 2.3 RESULTS SHOWN IN FIGURE 2.5

Energy from (A) ) (M)

$$z_o + \frac{P_o}{\gamma} + \frac{V_o^2}{2g} = z_M + \frac{P_M}{\gamma} + \frac{V_M^2}{2g} + \frac{f_{BN} L_{BN}}{D_{BN}} \frac{V_{BN}^2}{2g} + K_{ent} \frac{V_A^2}{2g}$$

$$+ K_{cone} \frac{V_B^2}{2g} + K_{bends} \frac{V_B^2}{2g} + K_{NK} \frac{V_E^2}{2g}$$

$$+ K_{expansion\ K,L} \frac{V_E^2}{2g} + K_{exit} \frac{V_L^2}{2g} + H_T$$

$$\uparrow\ \text{Turbine Head}$$

Energy from (E) (M)

$$z_o + \frac{P_{o2}}{\gamma} + \frac{V_{o2}^2}{2g} = z_M + \frac{P_M}{\gamma} + \frac{V_M^2}{2g} + \frac{f_{GH} L_{GH}}{D_{GH}} \frac{V_{GH}^2}{2g} + K_{ent} \frac{V_E^2}{2g}$$

$$+ K_{cone} \frac{V_G^2}{2g} + \frac{1}{2g} \frac{Q_I^2}{(C_V A_I)^2} + K_{IK} \frac{V_K^2}{2g}$$

$$+ K_{KL\ expansion} \frac{V_K^2}{2g} + K_{exit} \frac{V_L^2}{2g}$$

<u>Constants</u> (ACKNOWLEDGED EXPERIENCE FACTORS)
```
Acceleration of gravity, g ft/s2                    32.174
Seawater weight density, g lb/ft3                   64
Cone entrance loss coefficient, Kent                1
Funnel (nozzle) coefficient, Kcone                  0.5
Venturi branch coefficient, KNK                     0.4
Venturi run coefficient, KIK                        0.2
KKL (expansion)                                     0.3
Venturi exit coefficient, Kexit                     1
Moody friction factor from A to N, fAN              0.02
Moody friction factor from G to H, fGH              0.02
Venturi discharge coefficient, CV                   0.98
```

HYDRAULIC RAM
WITHIN INFINITE OCEAN CURRENT FLOW
FIGURE 2.5
POWER FUNCTIONS

Description
Flow through turbine and venturi with one entry cone leading to turbine and one entry cone leading to venturi.
Entry cones are at same depth even as shown in figures 2.3
Venturi exhaust outlet at same depth as entry cones.

Abbrevations ft=feet, s=seconds, cfs=cubic ft per second, in=inch, lb=pounds, psi=lb/in2

10 MW±
THEORETICAL POWER
POTENTIAL OF THE
FREE FLOW SYSTEM

Results
| | |
|---|---|
| Flow rate through turbine, 'Q' | 425.83 CFS |
| Velocity through turbine piping, (B)-(N) | 3.77 FT/S |
| Turbine power, horsepower | 13,544 HP |

Inputs using FIGURE 2.3
| | |
|---|---|
| Ocean current velocity, Vo | 8 FT/S |
| Turbine head produced, | 0.71 FEET |
| Turbine efficiency (0 to 100%) | 70 % |
| Depth of both cones and venturi outlet, | 200 FT |
| Turbine cone entrance diameter, (A) | 16' |
| Turbine pipe diameter, (B)-(N) | 12' |
| Length of pipe from (A) to (N) (thru turbine) | 60' |
| Venturi cone entrance diameter, (E) | 14' |
| Diameter of pipe from cone outlet to venturi, (G)-(H) | 12' |
| Length of pipe from cone outlet to venturi, (G)-(H) | 25' |
| Venturi throat diameter, (I)-(K) | 9' |
| Venturi exit diameter, (L) | 2' |
| Kbends | 0.3 |
| Velocity at system outlet, (M) | 0 FT/S |

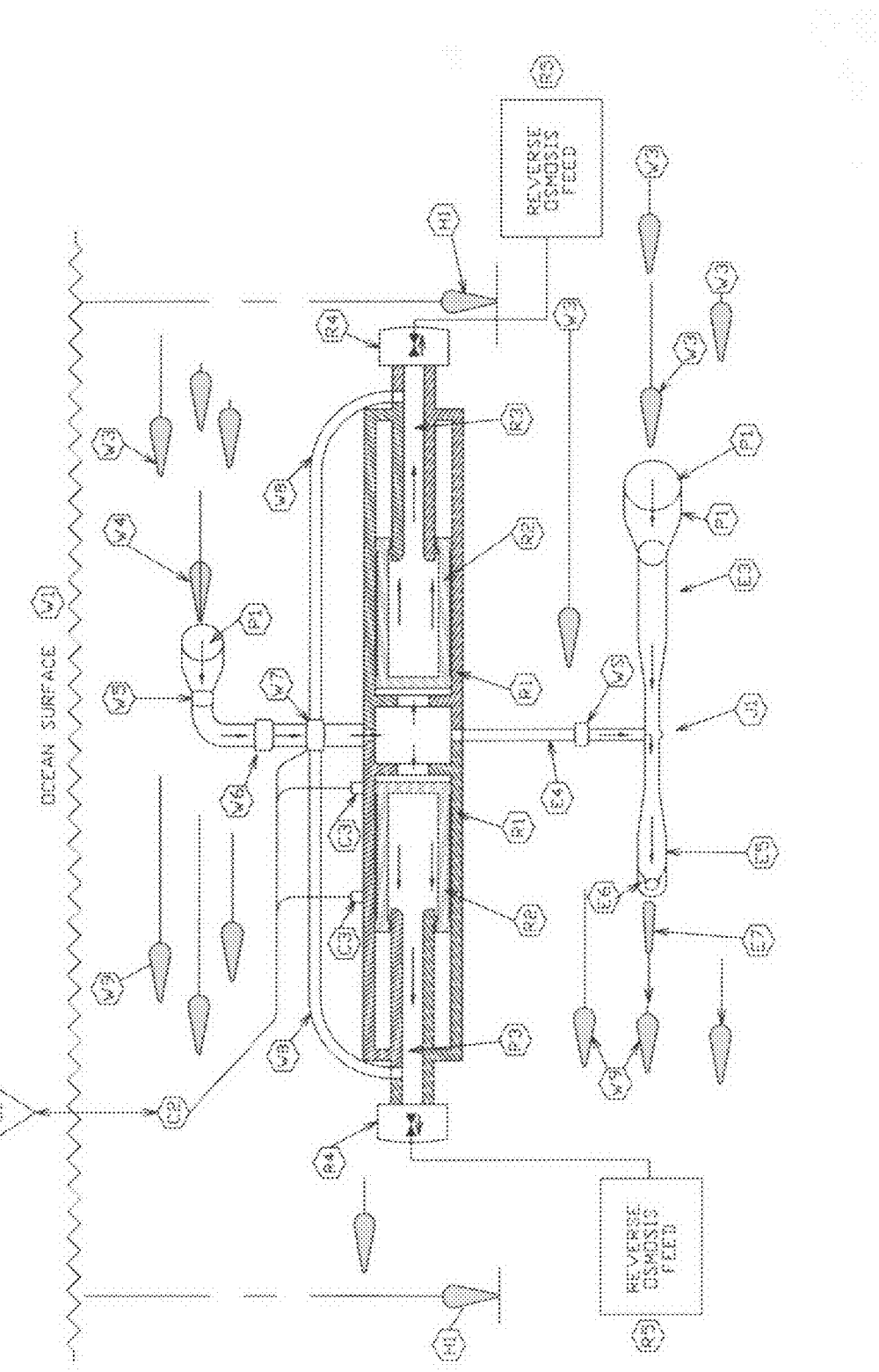

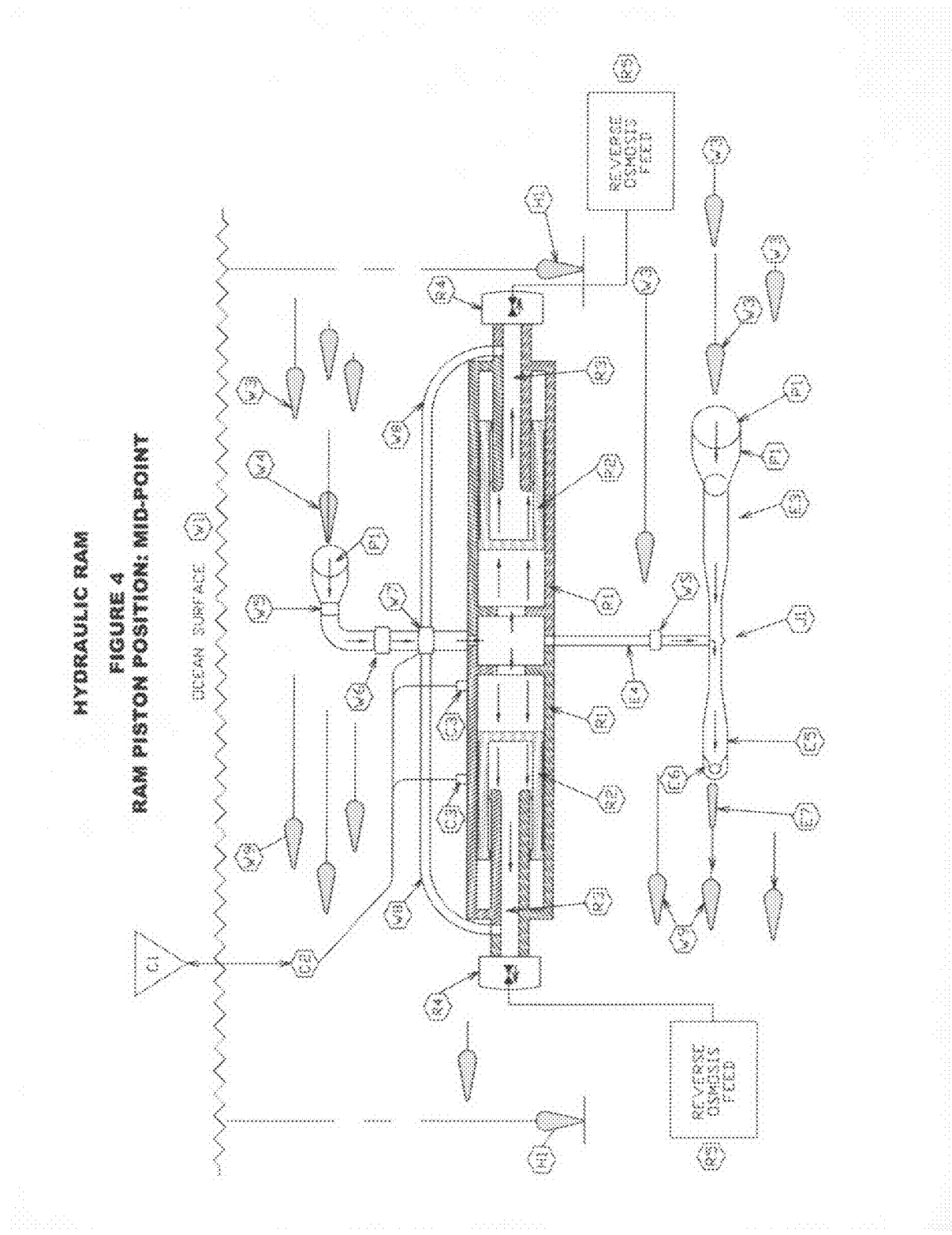

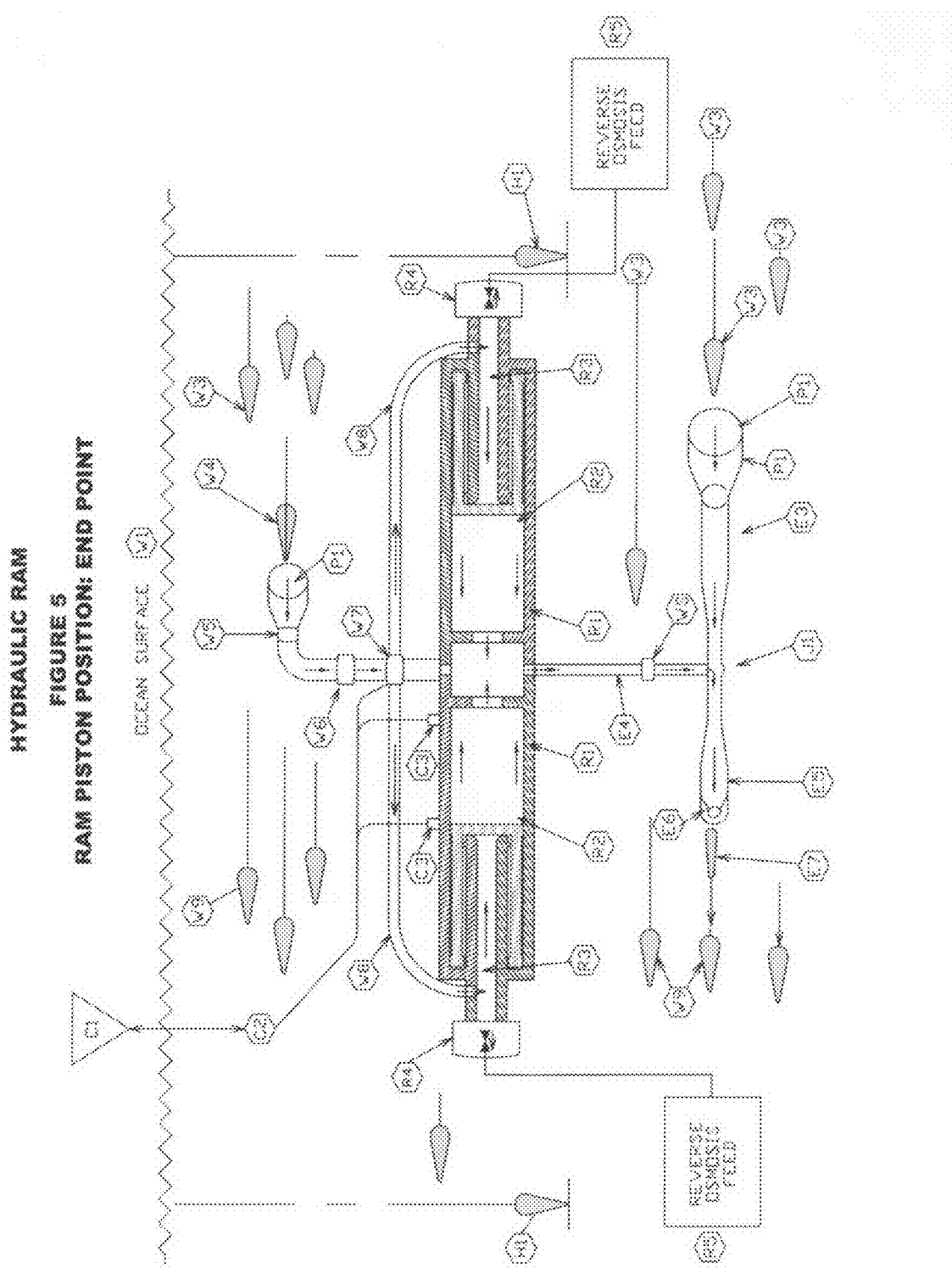

FIGURES 6
HYDROSTATIC PARODOX
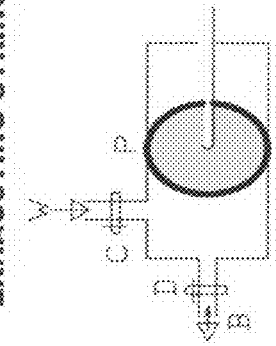
FIGURE 6A
EXHAUSTING SYRINGE
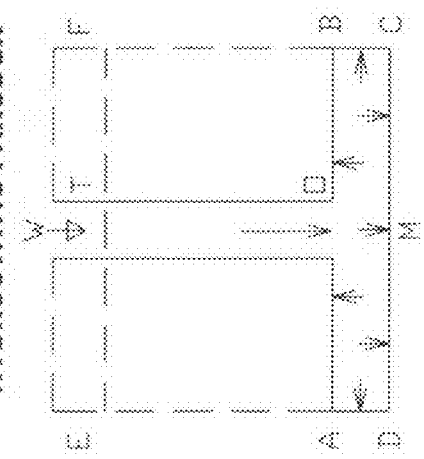
FIGURE 6B
VENTURI TUBE
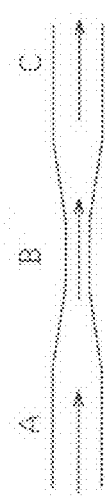
FIGURE 6C
JET PUMP
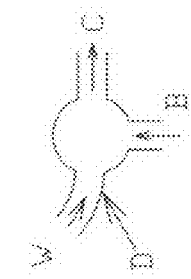
FIGURE 6D

FREE FLOW HYDRO-POWERED HYDRAULIC RAM

CROSS REFERENCE TO RELATED PROVISIONAL PATENTS

Provisional No. 61/272,131 19, Aug. 2009 FREE FLOW HYDRO-POWERED TURBINE SYSTEM
Provisional No. 61/213/247, 20 May, 2009; Provisional Application No. 61/195,401, 7 Oct. 2008, Provisional Application No. 61/129,468, 30 Jun., 2008; Provisional Application 61/136,184, 18 Aug., 2008, Hydro-Actuated Engine.

FEDERALLY SPONSORED RESEARCH RELATED APPLICATIONS

Not Applicable

STATEMENT REGARDING FEDERALLY SPONSORED RESEARCH AND DEVELOPMENT

Not Applicable

THE NAMES OF THE PARTIES TO A JOINT RESEARCH AGREEMENT

Not Applicable

INCORPORATION BY REFERENCE OF MATERIAL SUBMITTED ON A COMPACT DISC

Not Applicable

BACKGROUND OF INVENTION

1. Field of Invention

The objective of this invention is to capture hydro-kinetic energy from ever flowing ocean streams on a mass scale and then to apply (as the first priority), that energy as the prime mover for hydraulic rams. The ram could then become the prime mover in support of a sea water desalinization process, turning sea water into fresh water. This invention when housed and submerged deep in a moving body of water, such as the Gulf Stream, captures the motive forces of nature in a manner comparable to a land based hydro-powered dam as a prime mover. The ram, as the end item operating component, applies its hydraulic force to a resisting work load, such as that required to force sea water through a membrane to remove salt or as a secondary use, to apply this force to turn a turbine or series of turbines in generating electrical energy for later end item uses. After the ram's power stroke, the spent prime mover (water) which supplied the kinetic force, is then returned to the free flowing stream that is continuously moving through the conduit system for discharge by a jet pump utilizing the Venturi Principle. This is comparable to conventional land based dams which utilize draft tubes or out falls to power surface located turbines and then, to return or discharge their waste water into a tail race. The configuration and design of the conduit system in ocean streams offers almost unlimited freedom of choice for hydraulic engineers and naval architects in designing off-shore hydro-power facilities, for either the primary or secondary purpose of this enablement, which can then change velocity, mass or head pressure and volumes applied to specific work surfaces. Unlike the difficulty in locating suitable sites for a land based dam, this enablement can be located in all ocean streams moving over the earth's surface.

The application of this enablement as a matter of first priority for this invention is to provide high pressure sea water flows in support of reverse osmosis desalinization processes. It can power the equivalents of present day and future systems for removing salt from sea water, as well for other prime mover purposes.

This enablement creates an underwater all-purpose hydro-power capability, without consuming any fossil fuel or other type of non-renewable energy source and without the limitations, construction costs or adverse environmental or economic effects of comparable power sources.

Needless to say, there is an urgent need to switch from fossil fuels to those energy sources that are sustainable and non-polluting. Ocean currents flow at all depths, with the strongest usually occurring in the upper layer, which is shallow compared to the depth of the oceans. The main cause of such surface currents in the open ocean is the warming of the ocean waters by the Sun, the rotation of the Earth and the action of the wind on the sea.

The Gulf Stream starts roughly where the Gulf of Mexico narrows to form a channel between Cuba and the Florida Keys. From there, the current flows northeast through the Straits of Florida between the mainland and the Bahamas, flowing at a substantial speed for some 400 miles. It hits peak velocity off Miami, where the Gulf Stream is about 45 miles wide and 1,500 feet deep. There the current has reached a speed of as much as 7.75 mph in its narrow central axis. Although the peak current velocity of the Gulf Stream may at times exceed 7 mph in its narrow axis off of Miami, the most likely velocities for system placement in its central axis, which would most probably be between 4.75 and 6 mph.

The Gulf Stream, the Kuroshio and the Antarctic Circumpolar Current are the currents having velocities above 3 knots that flow throughout the year, the strongest currents recorded for the Gulf Stream and the Kuroshio in nautical miles per day. These speeds are equivalent to 156.5 statute miles per day (6.52 mph) for the Gulf Stream, and 133 statute miles per day (6.375 mph) for the Kuroshio. Because these speeds were determined by how far the current carried floating objects in 24 hours, they do not reflect the maximum current speeds at specific times or places.

Both the Gulf Stream and the Kuroshio are currents that are driven by the Coriolis force that is produced by the earth's eastward rotation acting upon the ocean currents produced by the trade winds. Because these currents are caused by the earth's trade winds and eastward rotation, they will continue flowing through the Straits of Florida and all others for as long as our planet continues to turn on its axis. These sources of hydro-kinetic energy are inexhaustible within the lives of man.

2. Description of the Related Art

I am aware of the following U.S. patents and patent applications pertaining to water powered devices and the like. None of the citations disclose a power system having the functional features or the capabilities of this invention. It is the marine counterpart of a land based hydro-power dam operating as a prime mover if such were submerged
within an ocean stream. Further none have a capability for industrial level output with unlimited, intrinsic potential for this unique invention. The entire prior art more or less uses mechanical approaches actuated by moving water when placed in opposition to its kinetic force. The structure of this enablement is placed in a moving stream and permits water to enter naturally and pass through, then and onward downstream without further disturbance. This is the marine equivalent of its land based cousin. Nothing like it is found in prior art.

U.S. Pat. Nos. 6,766,754 B1, dated Jul. 27, 2004, Ballast Exchange System For Marine Vessels by Thomas J. Scott and 7,240,631 B1, dated Jul. 10, 2007, Loop Ballast Exchange System For Marine Vessels, by Ahmed A. Al-Babtain are noteworthy. They, as opposed to using moving ocean currents as a prime mover kinetic force, use velocity of the ship when it is underway and moving to admit (force) sea water into the ballast tanks. The first named patent uses the incoming sea water to expel water from outlets at the top portions of the tank. The second named patent (loop ballast exchange) uses a one-entry-port conduit system to serve dual purposes, one is to fill and the other is to empty the ballast tanks. Drawing 3 depicts a conduit system using an incoming stream as a means of operating an Ejector system to suck the ballast water out from the bottom of the tank and to entrain it as part of the passing main stream which then being combined is discharged out the exit ports along the side of the vessel. This discharging operation as the sea water transits through the loop exchange system and is controlled by the opening of valves within the conduit system.

Furthermore U.S. Pat. No. 7,240,631, cited above, states "As will be apparent to one of ordinary skill in the art, the rate at which the water is changed in the vessel's ballast tanks will depend upon a number of variable factors, including the diameter of the intake ports, diameter of the main conduit, speed of the vessel, capacity of the ejectors, and the like. The determination of these variables and the necessary calculations required to effectuate the practice of the method and apparatus of the invention in a particular ship and under specific operating conditions are well within the ordinary skill of those working in the art." This being true as to the status of skill existing within the field of hydraulic flow management, determining such variables for my invention as would prevail under specific conditions for a theoretical site are simply a matter of calculation. Calculations as such do not change nor add to the disclosures made by a patent, the above one or mine as disclosed herein. As depicted in FIGS. 2.3 to 2.5 herein, Power Functions, derive theoretical calculations for a specific set of variables and as such predict the character and measures of the flows in simulating the operation of this invention as an equivalent electricity producing apparatus within an ocean current.

U.S. Pat. No. 3,922,012, dated Nov. 25, 1975, the Power Generator patented by Harry Herz, relates to a power generator apparatus for harnessing practical quantities of usable energy from water movement, such as submarine or "deep-sea" ocean currents, tidal flows and channel currents.

In this patent reference, a vast amount of energy is present in the constantly moving masses of ocean water which encircle three quarters of the earth. The obstacles which have hindered development of this energy source include not only the problem of developing an apparatus of adequately large size to convert the kinetic energy of water motion to an usable form of power such as electricity, but even more importantly, include the problems of building a structure massive enough to harness this power in practical quantities as well as the problem of positioning such an immense-sized structure in place for operation on an ocean floor.

In his patent, Herz made reference to U.S. Pat. No. 3,604, 942 (1971) patented by Curtis A. Nelson, which describes a generator device intended for installation on a concrete base along a river bottom. Improving the Nelson Patent, Herz adapted a variation to increase the efficiency and practicality of the paddle turbine structure.

In his Fluid Energy Converting Method and Apparatus, U.S. Pat. No. 4,184,805 (1980), Lee Arnold presented a device relating to techniques and an apparatus for harnessing the kinetic energy of a moving fluid stream and more particularly, to a cascade of airfoils or hydrofoils oscillating in a fluid stream to produce useful work.

Arnold sought to use his device to harness alternative sources of energy to utilize the inexhaustible kinetic energy of moving fluids such as the wind streams and even the oceans. Thus, instead of the large blades used in a device such as windmills or oscillating elements (a history of such devices is contained in the Arnold patent). Arnold uses oscillating air foils to further improve on this method.

With regard to the Subsurface Wave Power Generation Water Purification Systems and Methods (U.S. Publication number 2010/0193447), the common features are that both devices have a purpose of electricity generation and desalinization functions, but the referenced patent is attached to the sea floor while my device can either rest on the sea floor or be tethered above it. The primary mover of the two devices is completely different. The referenced patent reacts to the upward rising and falling movement within the body of water. This force is simply impressed on an opposing mechanical surface. The referenced patent has no features which contain or regulate a free flowing movement of ocean current and pressure of water at a depth as the prime mover, which is the essence of my invention.

The Renewable Resource Hydro/Aero-Power Generation Plant and Method of Generating Hydro/Aero-Power (U.S. Pat. No. 6,647,717 B2) recovers energy from fluid falling downward through a tower (duct) and converts it to hydro-power, this then being applied as a means for generating electricity and desalinization of water. The referenced patent is a land based system. It is not comparable to the primary mover of my invention: the free flowing mass of kinetic energy derived from the flow of an ocean stream at a depth.

With regard to the Stable Wave Motor (U.S. Pat. No. 5,842, 838), this device captures kinetic energy of wave motion occasioned by the rising and falling elevations of the sea surface as it is anchored in relation to the sea floor. This causes a vertical movement of mass in relation to the fixed positioning of the apparatus. The referenced patent and my invention both have objectives of generating electrical power and reverse osmosis desalinization of sea water. However, the primary mover of the two devices is completely different. My invention teaches the means of a free flowing regulated stream of movement and pressure at a depth into and through a structure as a prime mover of the user application.

Most of the patented inventions in the $20^{th}$ and early $21^{st}$ century attempting to harness the ocean for power generation have ignored key developments made in the $19^{th}$. Century. The insight for our solution comes from Clemmons Herschel's development of two patents: the Ventura Meter and the Fall Increaser (U.S. Pat. No. 873,435). The account of his thinking was given to the Harvard Engineering Society and published in the Harvard Engineering Journal.

Clemens Herschel (the inventor of the Venturi Meter) designed a head increaser where the discharge end, of a vertical, conical draft tube, was inserted into the throat of an enormous, horizontal, Venturi meter. The upstream end of the Venturi protruded into the impoundment and was gated. Its exit was into the tailrace. During normal flows, the entrance to the Venturi was closed, with its gate. The turbine discharged normally through the draft tube into the Venturi and out into the tailrace. During freshets, when the tail water was high, the gate at the mouth of the Venturi was opened. The excess floodwaters flowing through the Venturi, created a vacuum in the throat of the Venturi. Since the turbine draft tube was discharging into the Venturi throat, the turbine saw an increased pressure drop across its runner. The lost head created by the elevated tail water was effectively recovered.

The dual flow pattern principle embodied in Herschel's Fall Increaser was adapted to our submerged enablement as described herein. These insights relate to the use of multiple entry points for introducing the moving water stream (without limitations of conduit size, location or water supply) into and through and out of the power plant. This is embodied in our FIGS. 1 and 2 that relate to the prime mover conduit system. The mathematical simulation proofs for these insights (FIGS. 2.4 & 2.5, Power Functions) affirm both functionality and enormous power generation potential of this enablement. This invention permits us to manipulate the total force equation, i.e., velocity changes, mass flexibility and volume management for end item needs without ordinary restraints as to size, location, and an inexhaustible supply of hydro-kinetic energy moving across the surface of the earth. This allows the hydraulic engineer and naval architects to tailor make a prime mover (the ocean and its currents) to the widest range of hydro-power performance energy envelope.

All prior art ignores the fact that ocean currents are rivers and there is no requirement for a dam. This enablement has adapted the power plant function to be situated in the oceans of the world, while bypassing the disadvantages of a massive, expensive, stationary dam, with all of its problems. This enablement introduces the flow of the current through its structure (FIG. 1.1, Component Parts)] using the concepts of the Fall Increaser as described by Herschel in his article to the Harvard Engineering Journal. This opens up an inexhaustible moving supply to be harnessed for whatever energy needs are required.

The Free Flow Hydro-Powered Hydraulic Ram is an underwater power plant powered by the ocean, unlike any of these previously patented systems. All other attempts have failed to establish a basic hydraulic circuit in a totally submerged underwater environment. A generalized response can be made which clearly differentiates all of them from this patent application. It is my position that none of these referenced patents contain all of the elements listed below, which differentiates this invention from the prior art:

An inexhaustible body of water;

No prior art uses classic hydraulic ram technology in conjunction with electronic systems for remote control flow management in a depth of a moving body of water;

None of the prior art combines the use of hydraulics, hydrostatics, hydrokinetics, the Venturi Principle/Eductor, electronic control technologies, force multiplication and the technology to provide a highly pressurized flow of seawater to support reverse osmosis desalination processes;

The objective of this enablement harnesses the raw energy of the ocean currents, as a general purpose power source and applies this specifically as the prime mover for the hydraulic ram, which in turn provides a high pressurized flow of seawater for reverse osmosis desalinization processes.

In fact, the only common feature that all of these referenced devices possess with the invention which is the subject of this patent application is the use of moving water as a kinetic force. This invention is the perfect hydraulic circuit. It converts natural occurring kinetic energy into mechanical energy forms without any adverse effects on sea water.

Furthermore, to the extent that this enablement is used in support of the desalinization process, it assures an unlimited supply of fresh water;

In contrast, the standard forms of hydraulic rams are powered by conventional sources such as fossil fuel or electrical powered pumps. The hydraulic fluids travel through the ram at a high pressure force and are part of a hydraulic circuit. This includes a storage tank from which a prime mover draws the hydraulic fluid to be pressurized and returned back to the reservoir. In the case of this embodiment, the ocean itself is both prime mover and reservoir and avoids all problems associated with the use of fossil fuels for such purposes.

Capturing the Kinetic Energy of the Ocean: an Overview of the Attributes of this Enablement This enablement is a totally submerged power plant, which captures natural raw energy from flowing ocean current as a prime mover, thereby converting the natural energy of the water into mechanical energy form and in turn, by reason of a hydraulic ram with its Venturi/Eductor exhausting function. The form in which this captured raw energy is used can be the motive force to power other processes, such as removing salt from sea water.

This enablement has all of the following critical attributes;
a. It is submerged in a moving body of water oriented to capture the force of the moving stream;
b. Its structure, consists of the components described herein to constitute an entire physical plant, the upper portion of which resides on and above the surface of the water, that is secured from moving from a fixed position in relation to the sea floor and that is oriented so that the input points face toward the incoming downstream current and in proper relationship to other functional users. Furthermore, its water tight structure extends downward to the desired operating depth to provide the pressure (head) needed as the motive source to operate any system;
c. It derives its motive force from both the flow (velocity) and pressure of the water as the prime mover for both the power and exhaust functions;
d. Having captured the raw energy in the form of hydropower, it can be used to transform the power into mechanical energy.
e. Having transformed natural raw energy into mechanical energy, it then can be used to power any number of other processes within or outside the structure or above the surface of the water, requiring a high pressure flow as its motive force. It is capable of continuously operating in all respects, as a complete power plant when submerged in a moving current at a depth;
f. The Penstocks of the enablement, which feed the system, have shrouded, cone shaped entrance ways which embody the Venturi principle of accelerating the incoming force being fed into the system;
g. It is capable of continuously operating in all respects, as a complete hydro-power plant when submerged in a moving current at a depth;
h. The Penstock of the enablement, which feeds the ram central chamber, may as an option have one or more secondary lines to directly supply the water into the two compression chambers of the ram and return the pistons back to their stroke starting positions and expel the waste water from the ram for return to body of water from whence it came;
i. The function of this enablement is designed to transform the raw energy from its environment by applying hydraulic technology, Venturi-Eductor technology and a computer synchronized control system;
j. The power plant of this enablement literally processes the water through a ram to capture energy and the water is then returned to the surrounding body of water;

k. The Venturi/Eductor exhaust function of this enablement, which is independent of the power unit side, is powered by the water, as the prime mover;
l. The Venturi/Eductor exhaust function included in this enablement acts as a generic all purpose pump, which in effect, opens a vacant cavity or "hole" in the ocean. The suction created by the Eductor, clears the spent water from the ram chambers by entraining it within the Venturi jet pump for return to the surrounding body of water;
a. The efflux point for discharge is a nozzle and the form of the exit face itself, is blunt or truncated in shape, which creates an area of turbulence in the flow of water streaming past the pump body itself;
b. The benefit of this process is taking the full raw energy of hydro-power and transforming it to a high pressure sea water flow;
c. Thus, the enablement is a system with unlimited potential, capable of an infinite amount of electrical power production and expansion, by reason of the vastness of the water supply, as the motive force and of the unlimited locations for site placement;
d. The enablement makes use of an infinite renewable energy source and does not consume any matter in producing electrical energy.

The Revolutionary Hydraulic Ram Four Cycle Engine
a. Can be turned on or off at choice;
b. Performs the four classic cycles (intake, compression, force application and expelling) simultaneously, with each stroke;
c. Is a hydraulic system that has two independent end chambers, each of which has a piston;
d. Moves outward in response to a filling of the central chamber by a pressure in-flow from the penstock, the outward moving pistons apply pressure against/to water in the compression chambers;
e. Then reverses the movement to return to the start position and at the same time, refilling the increasing volume chambers with sea water;
f. Further, the refilling of the sea water under pressure is an adjunct, which assists the expelling of the water from the central chamber of the ram for discharge through the Venturi exhausting system and return to the downstream flow;
f. Is submerged in a moving body of water oriented to capture the force of the moving stream;
g. Receives raw water energy from both the oncoming flow and depth (head) pressure of the water as the sole prime mover;
h. Is capable of continuously operating in all respects within this ocean environment and depth, as a complete hydraulic circuit;
i. Has the ocean current as the sole prime mover for both the power and exhaust functions;
j. Transforms the raw energy from the ocean by using hydraulic technology, Venturi-Eductor technology, a computer synchronized control system operating the various valves and other management control components to achieve a reciprocating power cycle;
k. This engine literally processes the water to capture energy without any harmful effects as the water is then returned to the body of water from which it was taken;
l. The exhaust function, independent of the hydraulic side, is powered by the water, as its prime mover, it is capable of operating independently in all respects to serve other devices in need of a similar exhausting function;
m. With the ocean current flowing as a motive stream through the Venturi-Eductor assembly, the eductor is the linkage between the ram's cylinder chambers and the Venturi tube stream and as such introduces the drainage water as a secondary stream for onward transport;
n. And by the suction thereby created, evacuates the central cylinder chamber volume so the power stroke can begin when the compression chambers have completed their refilling with sea water;
o. All of these functions being within the state of art for electronic control of hydraulic functions and are performed in full compliance with Pascal's law and Bernoulli's Equations concerning the laws of conservation of energy;
p. Thereby, the result of the is a very favorable form of energy making use of an infinite renewable energy source which does not consume any matter in producing electrical energy.

BRIEF SUMMARY OF THE INVENTION

This invention has a structure submerged in a moving ocean current as a means of capturing its kinetic energy by permitting the current to flow through a uniquely configured conduit system within the structure. A portion of this kinetic energy is for diversion to serve as the prime mover of its operating component, a hydraulic ram. The remainder, unless otherwise used, just passes out the exit port. The ram component, as well as any other related items, is housed (water tight) within the structure.

Although separate from this invention, the fresh water filtering process is the beneficiary of its enormous capabilities when operating in consort with the hydraulic ram. Reverse osmosis is a filtration method that removes salt from seawater by applying brute force pressure to the seawater when it is one side of a semi permeable membrane. In commercial applications, high pressure pumps supply the pressure needed to push seawater through a membrane, even as the membrane rejects the passage of salt through it. This requires a large amount of energy. Typical pressures range from 800 to 1,800 psi for seawater. The largest reverse osmosis plant (Ashkelon) in the world is in Israel. By the end of 2001, about 15,200 desalination plants were in operation or in the planning stages worldwide. Some would use the reverse osmosis process, in any case they all require great amounts of energy to operate and certainly have undesired environmental effects for the planet over time.

Our Earth is a water planet. Within the oceans are moving masses of energy as ocean spanning currents with crushing pressure, due to depth. Thus far, harnessing of the currents for hydro-kinetic energy has been with limited success. Needless to say, the ocean streams are moving masses of energy with crushing pressure, due to depth. If mastered, the benefits are incalculable. In the Straits of Florida, the Gulf Stream, a moving body of water within the Atlantic Ocean, reaches depths of 2,000 feet and moves at the rate of about 5 miles per hour. This invention would be practical within such areas.

In the present circumstances, the common source of energy is by fossil-based fuels, which are not environmentally friendly and are finite in quantity. Finding renewable, environmentally friendly sources of energy is a matter of national security.

Hydropower is measured according to the amount of power released, or energy per unit time. Most hydropower comes from a mass, flow rate and/or pressure due to weight (head) which are the effects of elevation changes. Unfortunately there are only a limited number of suitable places for conventional hydro powered dams.

Principles of Physics Utilized in this Embodiment

This enablement relies on (1) the incompressibility of water and its mechanical properties, and (2) natural motive forces that assure the intake of pressurized water flowing into the shrouded, cone shaped inlets of the penstock leading to the hydraulic ram itself and for the motive force of its Venturi jet pump exhaust system. Gravity and other natural forces of nature assure the intake of water into all input ports as hydrostatic pressure together with a continuous water flow as a motive force for the Venturi Principle exhausting system.

Molecular energy is a property of water as stated in Pascal's Law. Its molecules are constantly moving. They slip and slide past one another even when they are at rest in their passive form. The movement of molecules in the water is molecular energy. The inexhaustible quantity of molecular energy in a body of water becomes the kinetic force which powers this enablement.

Specifically, this enablement has a structure submerged in a moving ocean current as a means of capturing its kinetic energy by permitting the current to flow through conduits within the structure. A portion of this kinetic energy is then diverted to serve as the prime mover of its hydraulic ram, the end user and operating production unit of this invention. This operating component is housed within the structure. The ram's duty cycle intakes sea water, like a syringe and then its cylinders cycle to pressurize and expel the volume of sea water which then becomes available to filter out salt from the water by a reverse osmosis desalinization process. Thus the objective of this invention is to produce a supply of pressurized sea water using the kinetic energy taken from the moving ocean current, which continually free flows through the structure as an inexhaustible kinetic energy source.

The end product of the ram is pressurized sea water, while the end product of the desalinization process the conversion of sea water into fresh water. Although desalinization is not a part of this invention, the desalinization process is the beneficiary of the enormous capabilities when operating in concert with this enablement.

To date, harnessing of the currents for hydro-kinetic energy has had very limited success. Needless to say, ocean streams are moving masses of energy with crushing pressure, due to depth. If mastered, the benefits are incalculable. In the Straits of Florida, the Gulf Stream, a moving body of water within the Atlantic Ocean, reaches depths of 2,000 feet and moves at the rate of about 5 miles per hour. This invention would be practical within such areas.

This invention relies on (1) the incompressibility of water and its mechanical properties, and (2) its placement at depth for hydrostatic head advantages (3) natural motive forces that assure the intake of pressurized water flowing into the shrouded, cone shaped inlets of the penstock and for the motive force of its Venturi jet pump exhaust system. Gravity and other natural forces of nature assure the intake of water into all input ports as hydrokinetic pressure together with a continuous water flow as a motive force for the Venturi Principle exhausting system.

When these forces and the technologies are properly employed, they enable a pressure differential to be established in an infinite pool of renewable energy. The advantage offered is the system consumes no matter. This system is portable and ready to apply hydro-power to a resisting work load. It could supply the high pressure to force sea water through a reverse osmosis membrane process to remove the salt from sea water to produces vast quantities of fresh water.

Principles of Physics Utilized in this Embodiment

The hydraulic ram is a lever which applies its force to pistons which in turn applies force as hydraulic power to a resisting work load. Water is in fact a machine. The ram is its fulcrum agent.

This free-flow hydro-powered hydraulic ram and Venturi jet pump system uses as its motive prime mover, a moving water mass such as an ocean current. Its purpose is to harness the kinetic energy present in moving bodies of fluid to drive the ram. The power (force) output is velocity (feet per second) times mass (weight).

This force operates against any resisting work load and is transformed into mechanical energy usable for any purpose. Water is in fact a machine when it encounters a fulcrum as in an opposing, resisting force. After such, as waste water it must then be discharged onward to become a part of the free flowing stream exiting the system back into the downstream.

The Venturi Principle, in the form of a jet pump, addresses the exhaust function.

Bernoulli's equation states that when water flows as a streamline through a pipe with a smoothly varying constriction, the flow will gain speed while passing through the constricted area (narrow space known as a Venturi tube). A pipe (known as an eductor) leading from the ram's central chamber to the Venturi tube will suck the water out and entrain it with water flowing thru the tube for discharge When placed at depth, gravity exerts pressure on every square inch of a solid's surface area of exposure. Therefore, external ambient pressure must be resolved in a submerged environment. The Venturi principle with an eductor function as a jet pump is an integral part of the invention. Its application provides for the exhausting of water back into the ambient environment. Pressures incident to the refilling intake of sea water into the compression chambers, following the power/compression stroke, are adjuncts to this discharge function;

The computer management control system must include sequencing programs and instrumentation sufficient to operate and maintain the system, with full consideration and inclusion afforded the requirements of specific end item applications. In brief, the system must be able to sense system conditions and sequence pressure flows thru the operating system of valves. For controlling the stroke reversal events, sensors are placed at the terminal points on the ram cylinder walls to signal when the piston is fully extended or retracted, after which a reversal of movement direction begins. This is the heart of a reciprocating engine.

Mechanical energy (compressed sea water is a solid and in essence is a mechanical equivalent of) from the ram's sliding pistons is the link, which applies hydraulic energy to a workload, which is suggested to be the removal of salt from sea water The system, being robust and expandable, can be designed and fielded as standardized system packages, ranging from miniaturized power versions to unique industrial sized versions.

The untapped source of kinetic energy is ocean currents, such as the Gulf Stream and other ocean currents, due to massive water flows. The movement of water and depth (hydro-static head) present in ocean currents is self evident, as is its powerful force.

This force operates against any resisting work load and transforms into mechanical energy usable for any purpose. Water is in fact a machine when it encounters a fulcrum as in an opposing, resisting force. After such, as waste water it must then be discharged onward to become a part of the free flowing stream exiting the system back into the downstream.

BRIEF DESCRIPTION OF THE SEVERAL VIEWS OF THE DRAWINGS

FIG. 1 is a flat plane representation of this enablement. An ocean stream of hydro-kinetic energy is represented as a dynamic force moving into, through and out of the whole system, then traveling on as part of a vast downstream flow. Its objective is to capture the kinetic energy for use as it transits the conduit system within the submerged structure, an object which is held in opposition to moving ocean stream. Natural forces assure its movement through the structure, thus this circumstance is comparable to a penstock flow out of a land based dam powered by the hydrostatic pressure of its intake from the bottom of the impounded water supply. The operating environments for this invention are the vast currents which are spread across the globe, infinite kinetic energy.

A portion of the flow is diverted to be the prime mover for the hydraulic ram housed above the conduit inside a watertight portion of the enablement. The operating environments for this invention are the vast currents within the ocean, which are spread across the globe, an infinite source of energy.

FIG. 2
Power Functions

The currents of the ocean are an infinite, ready source of kinetic energy that can be caused to flow both into and around this embodiment as an obstructing object. In doing so, they transform or release energy for beneficial use of productive work processes and moves the discharge from the system downstream. FIG. 1, Component Parts, denotes the component parts of the whole functional system.

The intake "A" of the ram is shaped as a cone (P1) which increases the velocity of the flow as it enters the penstock in transit as a diverted flow (FIG. 2.1, Power Functions) enroute to the ram cylinder chambers. The kinetic force of the flow is a function of velocity times the head pressure (H1) at the point of entry into the ram's chambers. The intake "B" functions in the same manner as intake "A" as prime mover of the jet pump.

The properties (velocity change and head pressure) determine the force level which powers penstock/jet pump conduits and the pistons of the ram.

The ram's piston surface areas act as force multiplication factors. The ram has two (R4) hydraulic outputs (depicted in FIGS. 3 & 4, Power Functions) The ram's power stroke, above figures, forces the water in its compression chambers to exit as high pressure sea water flows ready to be the prime mover for (R5), the end user process to remove salt from sea water i.e. Fresh Water. The sea water refills the compression chamber, as depicted by FIG. 5, Power Functions, and simultaneously the spent water from the stroke chamber is discharged into the (J1) Venturi jet pump/eductor for return to the downstream current flow, both events occur (FIG. 3, Hydraulic Ram) as the piston is returned to its starting end position.

FIGS. 3, 4 and 5, the Hydraulic Ram

These figures depict the operational phases of the device. All numeric notations are the same in each of the figures. The pistons are shown in different positions in the reciprocating phases of the duty cycle.

FIG. 3 demonstrates the beginning of the power stroke. The ram's piston is ready to begin its compression stroke.

FIG. 4 demonstrates the mid-point of the power stroke.

FIG. 5 illustrates the end point of the power stroke.

The double acting ram cylinder in FIG. (H1) used by the enablement has sliding piston pumps on each end. The pistons move in response to cylinder increases and decreases in chamber volumes. FIGS. 3 through 5 show the pistons at different points in their reciprocating movements which follow the increasing/decreasing volumes within their chambers.

FIGS. 3, 4 & 5 have common features and are as depicted below, however the features common to FIG. 1 for the penstock and jet pump are not repeated: These features are as follows; W6, W7, W8, R1, R2, R3, E4, WS, R4, R5, C1, C2, & C3. They are components of an equivalent four cycle engine whose parts are part of a reciprocating duty cycle and play different roles in its compression, expelling, refilling and discharging moments. Also they interact with the conduit system of the free flowing stream since it is an adjunct prime mover for the operation of the hydraulic ram itself. Accordingly, these parts and their role in the duty cycle are best described and understood by reference to the detailed description of the Hydraulic Ram, first embodiment as an end item component of this enablement, paragraphs [0119] through [0131], this specification.

FIGS. 6A-6D

FIG. 6A is the hydrostatic paradox is the power of water to be pressurized;

Let A B C D be a closed vessel, with a small hole O on the top, in which a narrow tube T is screwed, water tight. Let the vessel A B C D be filled with water W. The pressure on the bottom C D will be equal to the weight of a column of water whose base would be equal to the area of the bottom C D, and whose height would be T M; that is, it would be equal to the quantity of water W, which would fill a vessel whose base is C D, having perpendicular sides D E and C F, and whose height is D E;

However shallow the vessel A B C D, and however narrow the tube T O, an indefinitely small quantity of water may be made to produce a pressure on the bottom of the vessel which it contains, equal to the weight of any quantity of water, however great. The pressure depends only on the depth of D C below the level of the water in the tube T O.

FIG. 6B

When an exhausting syringe is inserted into a body of water and it intakes water, one of the chambers volume increases and the opposite chamber volume decreases;

The syringe is cylinder P having a solid piston moving air tight in it. Let C be a tube proceeding from its upper side, furnished with a stopcock C and let B be another tube furnished with stopcock D. Let tube C be inserted into a body of water W under ambient pressure. If the piston then be raised in cylinder, the cock C being open, the water W will under ambient pressure will rise so as to fill the enlarged space provided by raising the piston. When the piston is brought to the top of the cylinder, let cock C be closed and cock D be opened. By lowering the piston the water W will be expelled as the space is decreased.

FIG. 6C

The Venturi tube is based on the long known theorem of Bernoulli, in that a liquid flowing from left to right between A and B that the velocity increases and the pressure correspondingly decreases. There is a simple relationship which exists, as volume falls, the velocity increases and that as it moves from B to C the volume increases and the velocity decreases. The velocity at point B can produce a vacuum which is the basis for the eductor suction function of FIG. 2 D. When the two, 2C and 2D are put into a working relationship, such as exists in FIG. 1, the enablement, they can drain the spent water from the central chamber of R1, the hydraulic ram cylinder. This enables the power stroke to occur and thus to apply the water force W4 as mechanical energy via (R2) the sliding ram pistons to the fixed pipe or conduits providing a hydraulic pressure to a resisting workload such as a machine.

FIG. 6D

Pumps employing the jet-pump principle, long known, are as follows, the jet drags the surrounding liquid along with it causing a reduction of pressure beyond 'the nozzle and in the suction pipe sufficient to raise water from a sump or source. This principle in practical form was reported based on experiments in 1853.

As shown in FIG. 6D, the jet pump reduces the pressure behind the nozzle C and causes water to rise in the suction pipe B then the water supply, motive force moves through the delivery pipe D.

In this enablement, the motive force accelerates as kinetic energy velocity and entrains a second water stream sucked as waste water drainage from the chambers of the ram. As the chamber volumes in the ram cylinder decrease, the water being expelled is drained as a secondary water stream into the jet pump. This secondary stream is mixed with the primary (motive) stream and then through E5 and discharged as combined stream outside the system. As shown in FIG. 1, the motive force A2, is the prime mover which powers the suction force is in E4, the central chamber drain tube for the ram cylinder. This kinetic force A2 flows continuously into and through the pipe and nozzle. The jet-pump is known as a Venturi Eductor.

The discharged stream has lost part of its energy due to encountering the secondary stream and continuing as a combined stream. But it must be known that the pressure at the exit point is largely determined by the ratio (volume) of the two streams. Since the primary stream is not constrained in terms of force, being vast, it can have a favorable ratio in respect to the volume of the secondary stream. This ratio advantage, which can be as large as required, is not the ordinary case for fossil-fuel based prime movers which have economy/efficiency constraints;

The operating environment is the currents within the ocean, which are spread across the globe, an infinite source of energy.

The hydraulic ram is placed at a depth in a water-tight structure which provides both a surface level operating platform and a working floor for the system itself. (W1) denotes the ocean surface, (D1) is the depth from the surface to the ocean floor and (W3) is the upstream current. It is an irresistible force (velocity feet per second X mass or head) ready to enter and power the embodiment as a prime mover and to transform itself as hydro-power. In this form it can power any number of work processes, such as a reverse osmosis process, (R5), to remove salt from water. The current also is the motive force to power the Venturi jet pump/eductor, which returns the ram's spent water back into the currents downstream flow (W9).

The means of capturing the kinetic energy of ocean streams is taught in this disclosure of my enablement. It is the Power Function and all other relationships thereto. It is a new paradigm, simple and elegant, thus stream lines of kinetic energy, from the moving current, are isolated, routed, contained, regulated for velocity/volumes, as they are caused to enter into a submerged structure at depth & pass through it in a controlled/regulated manner by conduits/pipes in such a manner and circumstance as to be made available/render beneficial work in passages for exit downstream to rejoin the current, then passing by and away from the structure. The enablement is a solid structural object held in a fixed position in relation to the sea bottom and aligned in opposition to the course of the ocean stream's flow alignment. In observing the natural laws of the universe, this force of kinetic energy will operate against any solid object such as a blade, paddle, runner, or piston surface so placed in its way of passage and in so doing transform as hydropower to mechanical energy. Water is a machine as taught by my disclosure. It will be fully understood and appreciated as a hydraulic management process.

DETAILED DESCRIPTION OF INVENTION

First Embodiment

Overview of Invention

FIG. 2
Power Functions

This invention with its ram as the operating end-item component is in all respects a linear hydraulic motor which can perform all four-cycle engine functions simultaneously. When placed and operated at a depth, within a body of moving sea water, it is in fact, an infinite molecular power source.

To begin, the hydro-power hydraulic ram as depicted by (FIG. 1) is positioned in a body of flowing water (mass), at a depth and positioned by a bottom residing structure, attachment, or tether. The system's shrouded intake ports must be oriented so as to be directly facing the oncoming stream of flowing water. The exit or discharge point faces downstream.

The water flow passes thru the shrouded input port and flows through the inline replaceable filter and fills the conduit until it applies its restrained, force against the (S1) closed solenoid switched valve which control entry or denial into the ports of the three (3) chambers. One (C1) port opens into the central chamber of the ram cylinder. This is the power stroke chamber.

The ram cylinder contains two pistons within the end chamber of the hydraulic ram cylinder. The pistons act as pressure intensifier, positive displacement forcing pumps. The interior surface areas of the pistons in each chamber determine the flow and gallons per minute of highly pressurized water expelled out of the system for end user applications.

The inlet "A" of the ram is shaped as a cone (P1) which increases the velocity of the flow as it exits the cone and enters the penstock in transit to the ram cylinder chambers. The mass (weight) of the flow is a function of the head pressure (H1) at the point of entry into the ram's chambers. The inlet of "B" functions in the same manner as the motive power of the jet pump.

A port, being on end of (R3, fixed conduit, refilling of water from within the motive power source. The force of the water mass then bears on the respective interior piston surfaces and moves the pistons back to its power stroke starting position.

The reciprocating action of the double acting hydraulic ram cylinder is made possible by three chambers, which divides the ram cylinder body. There are two sliding ram pistons which serve as intensified placement water pumps. As the water force enters the central chamber it presses on and moves the two pistons forward and over the (R3), fixed conduits. After the power stroke, the water in the chambers of the ram cylinder are increasing in volume as the other opposing side decreases. The water in the decreasing chamber side, in response drain out to make room for return of the pistons to their power stroke starting position.

This invention uses the Venturi Principle method to drain the chambers of the ram cylinder following the power stroke.

This is how the Eductor pipe drains the decreasing volume chambers after a power stroke. The pipe (E5) beyond the constricted area is normal size, so the flow returns to about it original speed and pressure before exiting the pipe. The embodiment has a continuous stream (A2) of water running through it at all times as a motive power source.

The water flow passes thru the Venturi pipe exhausting system with a partial vacuum present in the educator pipe (E4) as it passes the Venturi constriction and out thru the jet nozzle (E6). At the same time a flow (W3) is also moving along the outer (external) surfaces of the total system. The ambient area in the vicinity of the Venturi jet nozzle exit point is in a vortex state with a lower pressure differential in the immediate front (E7) of the jet nozzle. The stream of water from the exhausting system exits and blends with the ambient flowing water stream pump chambers.

Downstream as the pipe regains its normal size, the pressure drops to a lower pressure level then when it first entered the pipe at (E2), entry port. The pipe when fitted with a tapered nozzle (E6) produces a jet stream with downstream cavitations with effects immediately in front of the jet discharge point. This facilitates the reentry of the drainage water into the ambient water mass flowing by the discharge vicinity.

The Venturi/Eductor assembly, as the ram's integral exhausting system, is equivalent to the suction side of the typical fossil fuel powered prime mover found in millions of ordinary hydraulic circuits, which are typical linear motors. Drainage water is discharged thru a jet nozzle in the exit portion of the Venturi exhaust pipe into the outside body of water flowing past outside the discharge point. The jet stream produces a turbulence area, or vortex area of cavitations.

The electronic process control director is connected above the water surface to an external power supply and is energized. The solenoid switching valves are either in a closed or opened position for all entry/exit ports. There are six (6) valves, one (1) which move the pistons from right to left as a stroke, by changing the direction of the water flow. This movement pattern is the heart of a reciprocating engine. This water powered engine does all four acts (functions) of a fossil-based four cycle engine: intake, compress, power and exhaust. Only it does so at great volume without consuming any matter in a total friendly way to the planet.

The system uses a Venturi/Eductor exhausting system. The process is managed by electronic sensors and solenoid switched valves to open/close the entry/exit ports. The pistons move back and forth in their chambers with the sensors signaling the cadence.

This invention is practical and operates in an environmentally friendly way of delivering hydraulic energy. In the preferred embodiment it can provide a hydraulic force at any desired intensity level and volume. The intensity level and volume of output is determined by the ratio of the pistons cross sectional areas differences. The system is portable and can be greatly expanded for increased volumes and pressure levels. The system can perform the work output of conventional fossil fuel powered prime movers. The difference is its prime mover is natural forces and its operation is completely environmental friendly.

The system is portable and can be greatly expanded for increased volumes and pressure levels for the generation of electricity or other uses. The prime mover is powered by natural, environmental friendly forces. The system can perform the work output of conventional fossil-fuel powered prime movers without the consumption of any fuel or any non-renewable resource. The difference is its prime mover, which is forces of nature at work, and its operation is completely environmentally friendly.

Component Description

All references made herein are to items as identified on FIGS. 3, 4 and 5.

This Invention is the equivalent of a four cycle engine powered by the natural forces (W2 & W3) of the earth, an infinite source of renewable energy. It does not consume matter. It transforms energy states.

In the preferred embodiment, the hydraulic ram is immersed in an overlying body of water. The (H1) hydrostatic head is further increased as a force by the velocity of the upstream (W3) flowing current entering the shrouded entry port (W4). The pistons within the two end chambers react to this force as a functioning unit i.e. thereby transforming energy to a workload external to the ram itself. The force entering the shrouded port (W4), since liquids are not kinetic as is a gas, proceeds via the ram as a leveraging fulcrum, then onward externally by a fixed conduit to encounter or impress its force against an opposing resistance. It could be an energy cell (accumulator) or a hydraulic cylinder (rotary motor) which in turn drives an electrical generator or other machine.

The water force enters the system at a single (W4) shrouded port oriented to receive the pressurized head of water (H1) with the downstream velocity of the (W3) water force flow. A conduit routes the water force to three (3) entry ports opening into the three chambered sections of the ram cylinder body. The conduit has a (W5) filter and a (WS) master solenoid controlled valve which regulates further entry farther into the system. It functions as start/stop (opened or closed) control. It remains open at all times during the system's operating mode.

The three (3) ports for entry by (W4) water force are opened/closed by (S1), a solenoid switched valve (W7). This valve can only be in an opened or closed state. The position of the valve determines the direction to be taken by the sliding ram pistons. By switching pairs of entry ports the pistons reciprocate back and forth, either resulting in a power output or one filling with water for a repeated stroke.

This enablement as a system is a double acting hydraulic ram. The ram cylinder (R1) has two interior walls, which separate three separate chambers. This cylinder applies a (W3 & H1) water force to the two (R2) sliding pistons, in effect being positive displacement pumps on the end of the ram cylinder body.

The (R1) ram cylinder acts as a fulcrum with (W4) water pressure acting as force on a long lever pushing two pistons, displacing a pressurized hydraulic energy stream into a fixed conduits associated with a resisting force, thus driving/activating a work output. The (H4) cylinder rod applies mechanical force to all (H3) pistons. The (R2) cylinder piston applies mechanical force to all (H3) pistons.

The hydraulic (R1) cylinder converts water pressure into mechanical energy by driving two (R2) pistons in a displacing action within chambers at the end of the ram. The hydraulic force enters/leaves both ends of the ram via two (2) ports. Solenoid switched valve (WS) opens and closes the ports for (W6) and (E4) as necessary for the proper operation.

The water in a pump chamber, when urged forward by a sliding piston (R2), applies hydraulic energy, (pounds per square inch), to any resisting object it encounters upon exiting the pump body at an exit port (R4). This hydropower could be used to direct drive a hydraulic pump, a rotary motor, or stored in an energy cell or an accumulator. A rotary motor, with an energy cell could act as an intermediary power source if needed and could drive an electrical generator. These items are not shown because they are clearly understood and self-evident to individuals skilled in the art of hydraulics.

The sliding cylinder pistons (R2) can multiply the hydraulic pressure (pounds per square inch) transferred by the power stroke. In this case, as the pressure is increased, the volume of water expelled is decreased. The ratio of the smaller interior piston areas to the larger exterior piston area is the force multiplier.

The critical spent water exhaust function is achieved by a drainage system using the Venturi Principle (J1, E4 and E6) with the motive power force supplied by the flowing (W3) water mass, together with an Eductor assembly (E4). The suction system being switched on and off by master control valve (WS).

Since water, being incompressible, occupies much of a cylinder's three (3) chambers following a power stroke, it must be removed partially, before another power stroke can begin in the opposite direction. A Venturi Principle pipe (E1) and eductor pipes (E4) are used to suction the water from the chambers and to discharge it outside the system where it merges with the passing water flow (W3, E7 & W7). Removal ahead of the reversing stroke prevents back pressure resistance within the chambers as they are decreased in volume.

This ram, comprising two (2) reciprocating pistons is managed by an electronic controller director (C1) with its interrelated wiring network (C2) which handles signals from piston positioning sensors (C3) at stroke terminal points to activate two (2) solenoid controlled valves (WS and W6). These valves regulate the reciprocating functions of the total system.

A signal that a piston is at a terminal stroke point in will energize the valve to move to on/off positions, thus reversing the flow into or out of parts. The open or closed state for each valve depends on which direction, right or left, the power or refilling/drainage stroke is to move.

Software programs and hardware, as in components (C1, C2 & C3) are readily available prior art from commercial suppliers to the hydraulic actuator trade who design and produce for specific applications.

The ram has two master control valves responding to an electronic command to open or close. They deny or permit the water to enter or exit the system. The purpose is to control the operating mode of this enablement by automation.

While in the foregoing specification, the first embodiment of the whole system with the hydraulic ram as end item component has been set forth in considerable detail for purposes of making a complete disclosure thereof, it will be apparent to those skilled in the art that numerous changes may be made in such details without departing from the spirit and principles of the invention.

What is claimed is:

1. A system comprising a watertight structure with interior conduits in which a moving body of seawater is channeled through its passageways as hydro power at a depth and around its exterior surfaces, a prime mover for at least one of hydraulic or electricity generation, and a hydraulic ram powered by seawater from one of the interior conduits, wherein said hydraulic ram feeds a highly pressurized flow for an offsite reverse osmosis process and said hydraulic ram is housed within the watertight structure, which is partially submerged within the surrounding body of moving water with its base firmly anchored to or resting on the sea floor with its forward surfaces facing the oncoming current of the moving body of seawater.

2. The system of claim 1, wherein the shape of the structure, as a solid object impeding the flow of the body of water passing around it, is aerodynamically contoured as means of minimizing disturbances of the flow in its downstream movement along the external structural surfaces to facilitate the discharge of waste water from the structure's exit point.

3. The system of claim 1 wherein the Penstock and venturi conduit are located within the structure at the same or different depths, as a means for providing the force needed for said prime mover.

4. The system of claim 3, wherein the velocities of the water flowing through the conduits are increased by means of cones or frustum shaped exit and entry points with larger entry areas and smaller exit areas to provide the force needed by said prime mover.

5. The system of claim 3 further including a free flowing, continuous movement of water through an interior conduit, wherein at an intermediate point of the conduit, the force in the penstock is impressed upon the hydraulic ram, thereafter the flow being exhausted from an eductor into the venturi conduit passages as a means of discharging the flow back into the body of water flowing outside and past the structure.

6. The system of claim 1, wherein a portion of the water force flowing through a primary penstock conduit can be partially diverted into a secondary penstock conduit placed in the flow stream as a means to provide an on demand prime motive force to said hydraulic ram situated in the watertight containment space provided in structure, said secondary conduit includes a remotely sensor controlled shut off valve in the compartment space as a service connection point for the hydraulic ram and, when necessary can be shut off and disconnected for system maintenance, to prevent the continuous secondary penstock conduit flow from flooding the interior compartment.

7. The system of claim 6, wherein a controller, when energized from an external power supply, opens the master on/off valve of the secondary penstock to permit the prime mover sea water to flow, the master valve of the secondary eductor also to be closed, the valve in the secondary penstock then directing the flow to fill the chambers of the two cylinders, thus urging the pistons towards the main chamber terminating in the beginning position of the power stroke, at which point the sensor detects the piston's position and signals via the electrical network to the controller which then causes the on/off valve of the secondary eductor to close and the valve in the secondary penstock to direct the flow to enter the main chamber and to expel the water from the cylinder chambers onward thru one-way check valves as a pressurized prime mover flow for a reverse osmosis fresh water process.

8. The system of claim 1, wherein a secondary eductor conduit includes a service connection point in the interior compartment space for service of the hydraulic ram, said secondary eductor conduit includes a remotely sensor controlled shut off valve, and the smaller conduit intersects into and empties discharging waste water into a primary eductor which connects a primary penstock with a venturi and through which there is a continuous water flow, whereby the discharge of waste water from the hydraulic ram is regulated and back pressure from the continuous flow is prevented from backward flooding of the interior compartment of the structure.

9. The system of claim 8, wherein the hydraulic ram connects to the secondary eductor for its prime mover force and for discharge of waste water into the continuous water flow in the primary venturi conduit.

10. The system in claim 1, wherein a highly pressurized sea water flow is supplied by operation of the hydraulic ram, as a linear motor, in support of a reverse osmosis fresh water process by means of controller commands to start, stop and then reverse stroke direction through the piston chambers as occurs in reciprocating cycle movements, initiated over and over in reaction to sensors that detect relative piston positions when the power/expelling or intaking/discharging are at their terminal positions in the cylinders.

11. The system in claim 1, wherein the system operates as a prime mover in a free flowing river.

* * * * *